(12) United States Patent
Hardin

(10) Patent No.: US 11,951,759 B2
(45) Date of Patent: Apr. 9, 2024

(54) MAGNETIC PUF WITH PREDETERMINED INFORMATION LAYER

(71) Applicant: Lexmark International, Inc., Lexington, KY (US)

(72) Inventor: Keith Bryan Hardin, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 17/902,779

(22) Filed: Sep. 2, 2022

(65) Prior Publication Data

US 2022/0410612 A1    Dec. 29, 2022

Related U.S. Application Data

(63) Continuation of application No. 16/817,027, filed on Mar. 12, 2020, now abandoned.

(60) Provisional application No. 62/822,510, filed on Mar. 22, 2019.

(51) Int. Cl.
| | |
|---|---|
| *B42D 25/45* | (2014.01) |
| *B42D 25/369* | (2014.01) |
| *B42D 25/373* | (2014.01) |
| *G06K 19/06* | (2006.01) |
| *G06K 19/08* | (2006.01) |

(52) U.S. Cl.
CPC ......... *B42D 25/369* (2014.10); *B42D 25/373* (2014.10); *B42D 25/45* (2014.10)

(58) Field of Classification Search
CPC .... B42D 25/45; B42D 25/369; B42D 25/373; G06K 19/06037; G06K 19/06; G06K 19/06187
USPC ..................... 283/67, 70, 72, 74, 94, 98, 901
See application file for complete search history.

(56) References Cited

FOREIGN PATENT DOCUMENTS

| | | | | |
|---|---|---|---|---|
| EP | 2230794 A2 * | 9/2010 | ............. | B82Y 10/00 |
| WO | WO-2010105993 A2 * | 9/2010 | ............. | B82Y 10/00 |

\* cited by examiner

*Primary Examiner* — Justin V Lewis

(57) ABSTRACT

The invention adds a Physical Information Layer ("PIL") to the magnetic particles within a matrix that creates an unclonable physical unclonable function "object." The PIL assists in searching to find the combination that matches a predetermined enrolled combination with additional information that includes a search index, which limits the range of data required to search in order to find a match in the enrolled database. The index could be a predetermined value that associates the random magnetic profile values to a list of enrolled values in a database. The additional information may include product or general information that needs to be easily communicated to a user of the PUF.

5 Claims, 4 Drawing Sheets

MAGNETIC PUF WITH PREDETERMINED INFORMATION LAYER

CROSS REFERENCES TO RELATED APPLICATIONS

This application is a continuation application of U.S. patent application Ser. No. 16/817,027, titled "Magnetic PUF with Predetermined Information Layer" filed on Mar. 12, 2020, which claims priority under 35 U.S.C. 119(e) from U.S. provisional application No. 62/822,510, filed Mar. 22, 2019, titled "Magnetic PUF With Predetermined Information Layer." This application is also related to U.S. patent application Ser. No. 16/816,948, titled "Hall Effect Prism Sensor" filed on 12 Mar. 2020.

BACKGROUND

The present disclosure relates generally to a physical unclonable object ("PUF") with magnetized particles that result in a unique magnetic fingerprint with a predetermined information layer attached to the PUF that assists in identifying the PUF in an enrolled data base.

SUMMARY

A PUF with a magnetic matrix is information dense. The invention adds a Physical Information Layer ("PIL") to the magnetic particles within a matrix that is independently detectable, which creates an unclonable PUF "object." The PIL assists in searching to find the combination that matches a pre-determined enrolled combination with additional information that includes a search index, which limits the range of data required to search in order to find a match in the enrolled database. The index could be a predetermined value that associates the random magnetic profile values to a list of enrolled values in a database. The additional information may include product or general information that needs to be easily communicated to a user of the PUF.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
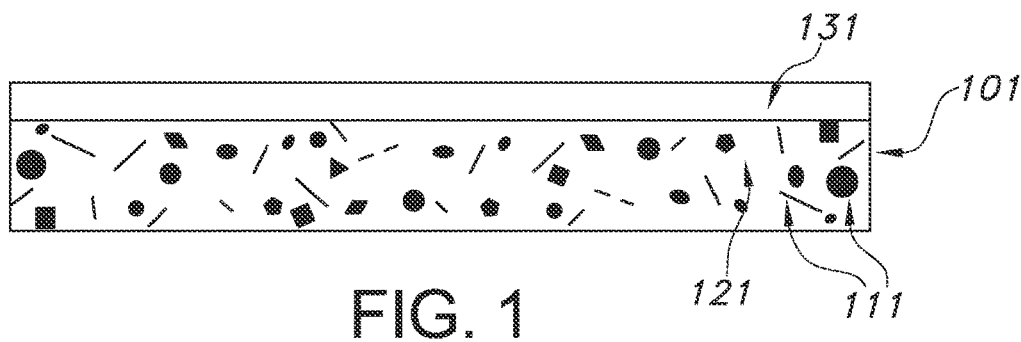
FIG. 1 shows a Physically Unclonable Function ("PUF") object cross section with predetermined information layer.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having," and variations thereof herein is meant to encompass the items listed thereafter and equivalents thereof as well as additional items.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top," "bottom," "front," "back," "rear," and "side," "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc., and are also not intended to be limiting. Like terms refer to like elements throughout the description.

The magnetic matrix PUF object is information dense. A surface array of magnetic one ("1D") to three-dimensional ("3D") sensors may find a series of magnetic measured values that have a special relationship to each other depending on the location, shape, and magnetization of magnets of an object. A challenge is that searching this information to find the combination that matches a pre-determined enrolled combination is time consuming when implemented at scale. A solution for this challenge is additional information which includes a search index that limits the range of data required to search in order to find a match in the enrolled database. There is an additional need to know the relative location of a sensor on the device to know if the sensor is in the correct boundaries for reading the magnetic profile of an area of the PUF. The index could be a predetermined value that associates the random magnetic profile values to a list of enrolled values in a database. The additional information may include product or general information that needs to be easily communicated to a user of the PUF.

The invention adds a Physical Information Layer ("PIL") to the pre-magnetized magnetic particles within a matrix that creates an unclonable PUF "object." The PIL can be constructed from a material that does not substantially alter the static magnetic field created by the magnetized particles and matrix dielectric material. Any non-ferrous conducting material can be used, such as aluminum or copper. Super conducting materials should, of course, be avoided for this purpose. The eddy currents of a super conducting material would have a direct effect on the magnetic field values about the object. Any finite resistance material having a volumetric resistance greater than 0 would have an initial eddy current that would dissipate and allow the magnetic field to penetrate the PIL. FIG. 1 shows a PUF object 101, that contains at least pre-magnetized particles of various shapes 111, within a matrix 121. The PIL 131 overlays the PUF 101.

Figure 2A:
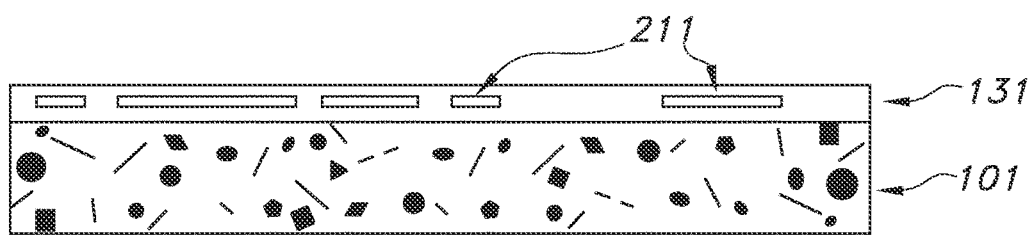
FIG. 2A shows a cross section of a Predetermined Information Layer ("PIL") within the layer.
Figure 2B:
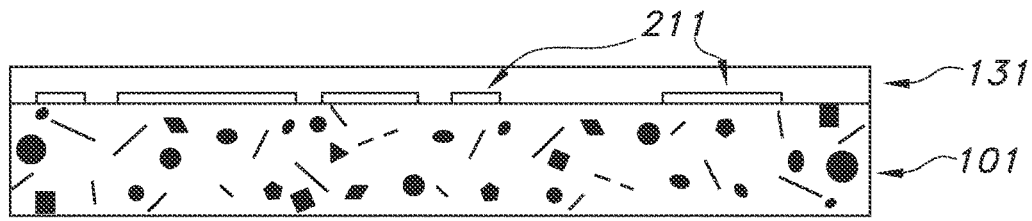
FIG. 2B shows a cross section of a PIL below the layer of the PUF object.

It is to be understood that the PIL 131 may be incorporated into PUF object 101. The PIL can also be an additional layer of different material that is attached to a surface of a PUF. As shown in FIGS. 2A and 2B, the conducting material in the PIL can be imbedded or layered in the upper or lower the area of the PIL. In FIG. 2A, the conductive cross-section material 211 is shown embedded in the PIL 131. In FIG. 2B, the conductive cross-section material 221 is shown attached to the lower surface of a PUF 101, with the substantial PIL material 131 overlaying. This additional PIL 131 can be applied by an adhesive, bonded by sintering, or other attachment method.

Figure 3:
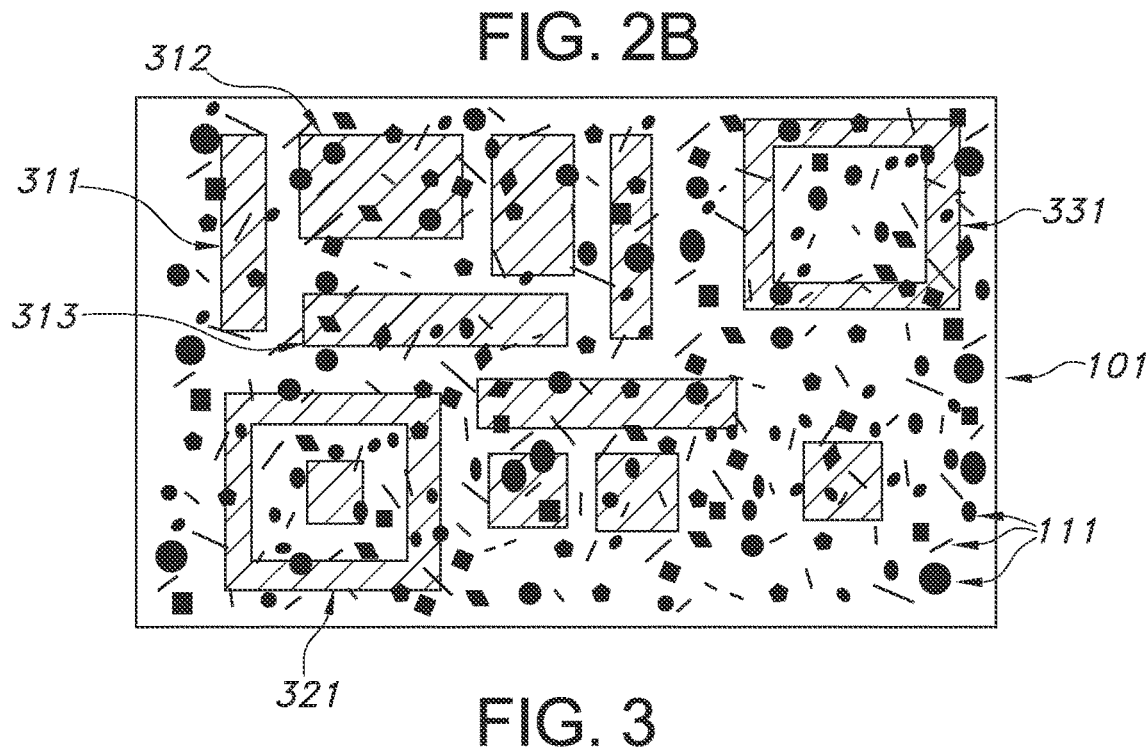
FIG. 3 shows the top view of PUF object with predetermined information overlay.

The top view of the PUF with a PIL is shown in FIG. 3. The block areas 311 show where the conducting material can be placed over the PUF 101. This may resemble a quick response ("QR") code-like structure, where the black print has been replaced with a conducting material. A key feature is that each of the conducting elements 311, 312, 313 in the PIL 131 would preferably be substantially larger than the pre-magnetized particles 111 within the PUF 101. This allows a sensor (not shown) that detects conducting material to distinguish between the pre-magnetized particles 111 within the PUF 101 and the conducting material 311 of the PIL 131. Since the pre-magnetized particles 111 within the PUF 101 are randomly oriented, it is possible that these particles could be misinterpreted as part of the PIL 131. This is not necessarily a problem because the PUF 101 and PIL 131 can be measured and enrolled after the object has been manufactured. If the PIL is influenced by the pre-magnetized particles 111, then a statistical approach may be used to map a small number of PIL and pre-magnetized particles 111 before giving a probability of a match between the measured PUF and a list of enrolled values in a database.

The two box-like structures 321, 331 in FIG. 3 represent fiducials that can be easily recognized by a reader (not shown) to orient the enrollment of the magnetic profile of the PUF 101 and the PIL 131. Orientation of the PUF 101 by fiducials will greatly increase the speed that a computer identifies a match of the magnetic pattern.

The reader for measuring the PIL 131 and PUF 101 can be adapted from the Hall effect prism disclosed in U.S. application Ser. No. 16/816,948 filed concurrently, which is incorporated herein in its entirety by reference. In U.S. application Ser. No. 16/816,948, a resistive substrate is used to measure the deflection of current due to a magnetic field. This was shown by creating a direct current ("DC") current flow within the substrate and measuring the potential distribution on the surface. This would yield a direct response from the magnetic profile of the PUF object. Also disclosed was a capacitive coupling method to induce a current within the substrate along conducting wires that were randomly oriented within the matrix. The capacitive coupling is created by applying an alternating current ("AC") or time-varying source signal. In typical capacitive sensing, the change in capacitance is sensed by comparing adjacent pad locations for a change in impedance. While that approach will work here, additional information can be extracted by looking at the propagation of a signal across multiple pad locations. For example, the conductor 311 in FIG. 3 has a length that may be several sensor pads in length. By scanning all combinations of source and measurement locations, the length and location can be determined. In this sense, conducting segments of the PIL behaves more like a transmission line.

These approaches create a powerful method to enroll and quantify the PUF object quickly, which can be achieved with a very thin substrate. This system can be made transparent for a touch sensor for a mobile reader device.

Figure 4:
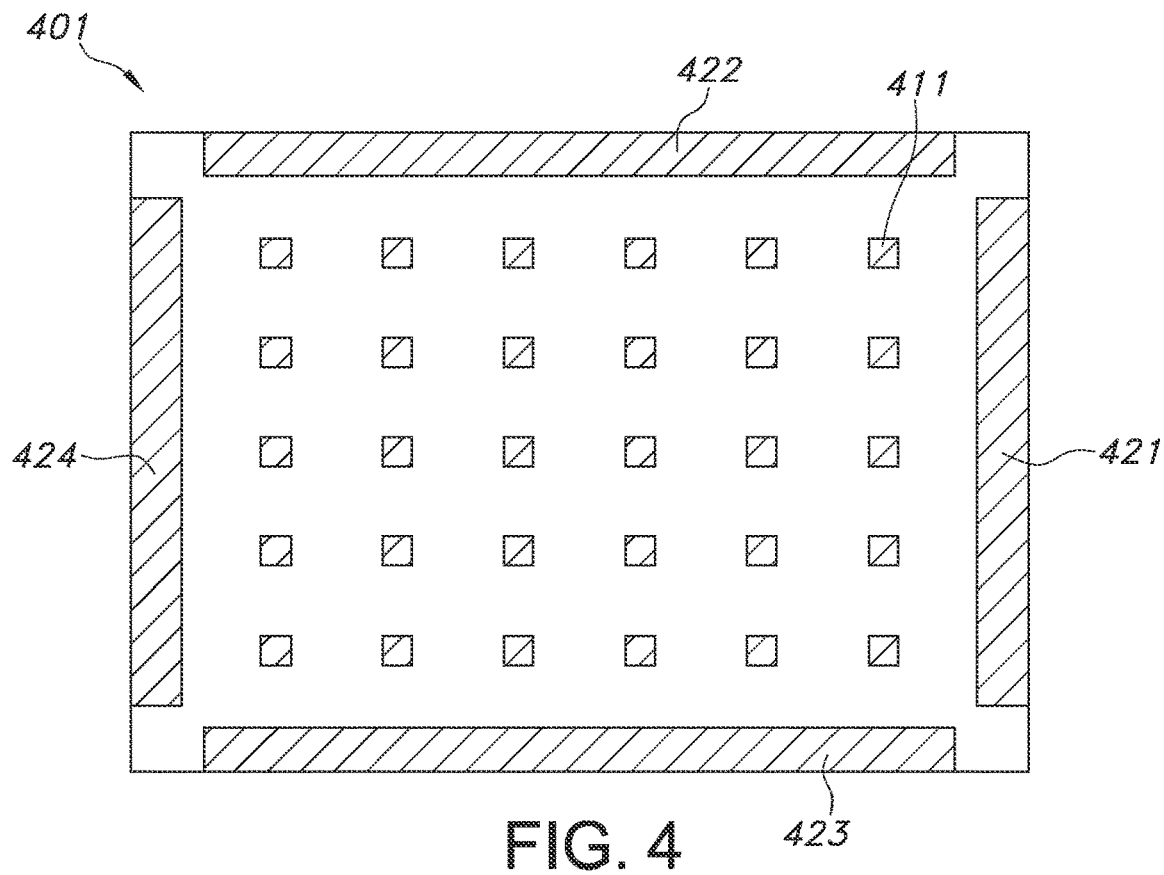
FIG. 4 is a magnetic and capacitive sensor array.
Figure 5:
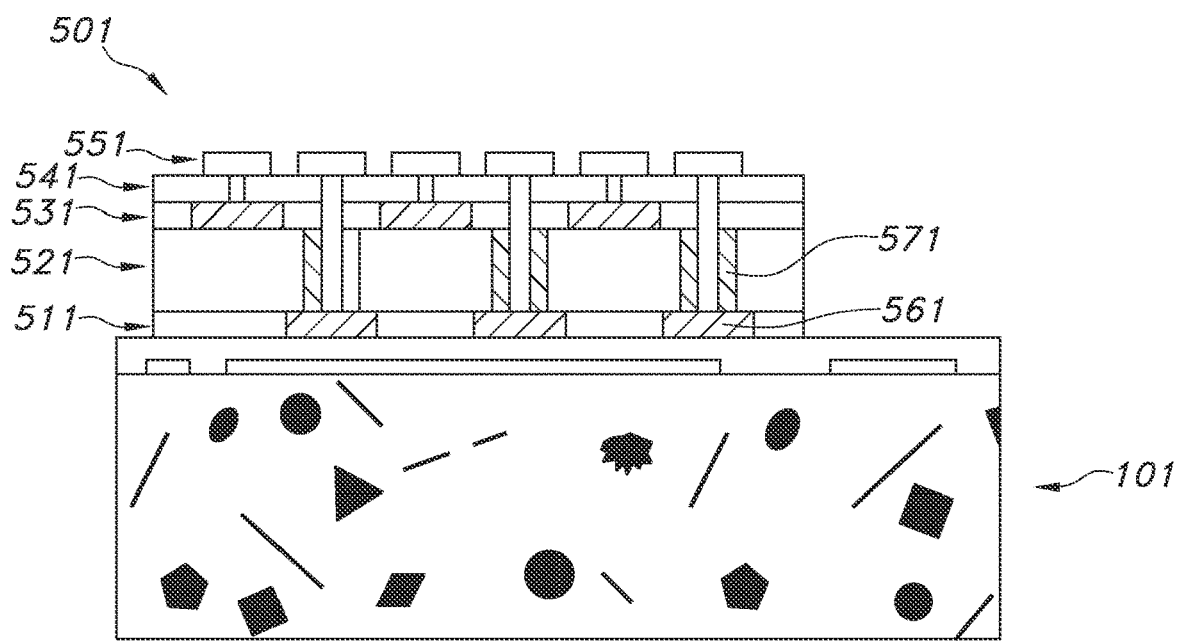
FIG. 5 shows a conducting pad isolated by a resistive substrate to make the connection to the top wiring channel.

FIG. 4 shows a surface array 401 of sensor pad locations 411. The 4 large rectangular conducting pads 421, 422, 423 and 424 can be used to bias the Hall effect by applying a current to opposite sides. Each of conducting pads 421-424 are optional depending on the mode of operation. FIG. 5 shows a Hall effect prism disclosed in U.S. application Ser. No. 16/816,948. FIG. 5 shows a central area cross-section of a sensor for one of the embodiments described positioned on a PUF object with a PIL. This embodiment has the ability to measure 3D directions of magnetic field reaction to the PUF object.

FIG. 5 shows a conducting pad 561 isolated by a resistive substrate 521 to make the connection to the top wiring channel in layer 551. For this implementation, the conducting via must be isolated from the substrate by the insulator 571 so that the current primarily flows from top to bottom when measuring X and Y directed magnetic field effects. A wiring channel layer 551 connects the center conducting vias 541 to the conducting pads in layers 531 and 511 to the substrate 521. While the dielectric material will obstruct the current flow, it will stop the conducting via from shorting the vertical flow of the current from 561 through the substrates 521 to the wiring channels found in the 551 layer. The sensor 501 cross section of FIG. 5 has five layers shown. The bottom layer 511 has several pads 561 that correspond to the sensor pad locations 411 in FIG. 4. These pads make conductive contact to the resistive substrate material in layer 521 that is the majority of the layer 521 above the bottom layer. The regions 571 in the substrate material are an insulating dielectric material that separates the substrate from the conducting via from the bottom pad to the top layer wiring and circuitry. The layer 531 above the substrate is a dielectric layer with conducting pads 411 and 561 in contact with the substrate. Above conducting pads above the substrate is a dielectric layer 541 that separates the sensing region of the substrate and contact pads and the wiring channels and circuitry on the top layer 551. One skilled in the art would understand that any number of layers may be added to the top to perform all the needed wiring channels and circuits necessary to perform the measurements of the substrate and communicate the information to other systems.

There are several combinations of stimulus that are applied to extract the desired information from the PUF object. In one implementation, an AC signal is supplied to one or more of the sensor conducting pads, and the voltage is measured in the region around the source. This method will couple a portion of the energy from the sensor source pad to the PIL of the PUF object. The signal will travel through the continuous conduction path of the PIL to each of the nearby sensor measurement pads. By programmatically looping through the source and measurement locations the image of the PIL is determined. The AC signal may be sinusoidal or any other time changing waveform that facilitates a substantial received signal. These other signals may include square, impulsive, or triangular, for example.

With the applied stimulus at one pad, the received amplitude at other pad locations can be measured. This can be an AC, sampled DC, or peak detected measurement. Each measurement technique offers different accuracies and speed of measurement. The preferred technique would be either a sinusoidal or square wave. The received sinusoidal wave may be filtered to reduce interference. Moreover, the square wave has higher frequency content that would allow faster identification.

The PIL is then used to lookup the magnetic image or other user desired information to be verified against the unique random magnetic information. The magnetic information is read by using geometry FIG. 4, for example, as a Hall effect sensor.

Figure 6:
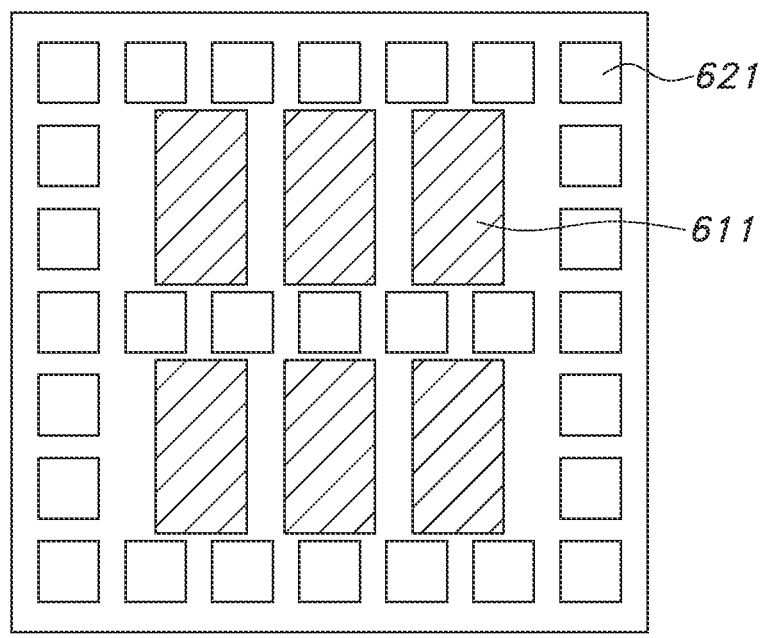
FIG. 6 shows an array of six standard Hall effect 3D sensors.

In another embodiment, the Hall effect prism may not be optimal for making calibrated or high precision magnetic field measurements. For this system an integrated or discrete array of Hall effect sensors may be used that are separated by a larger distance. This system requires indexing to speed the matching process. Previously disclosed was an optical system for measuring a QR code information that was detected by a camera near by the PUF object. The concept here is to integrate the capacitive reading system with integrated or discrete Hall Effect sensors. FIG. 6 shows an array of six standard Hall effect 3D sensors 611. The pads 621 surrounding the sensors 611 are the conducting pads for measuring the capacitive or transmission line PIL layer. The density of this information would be substantially less, but would give a minimal index number as well as fiducial locations.

Figure 7:
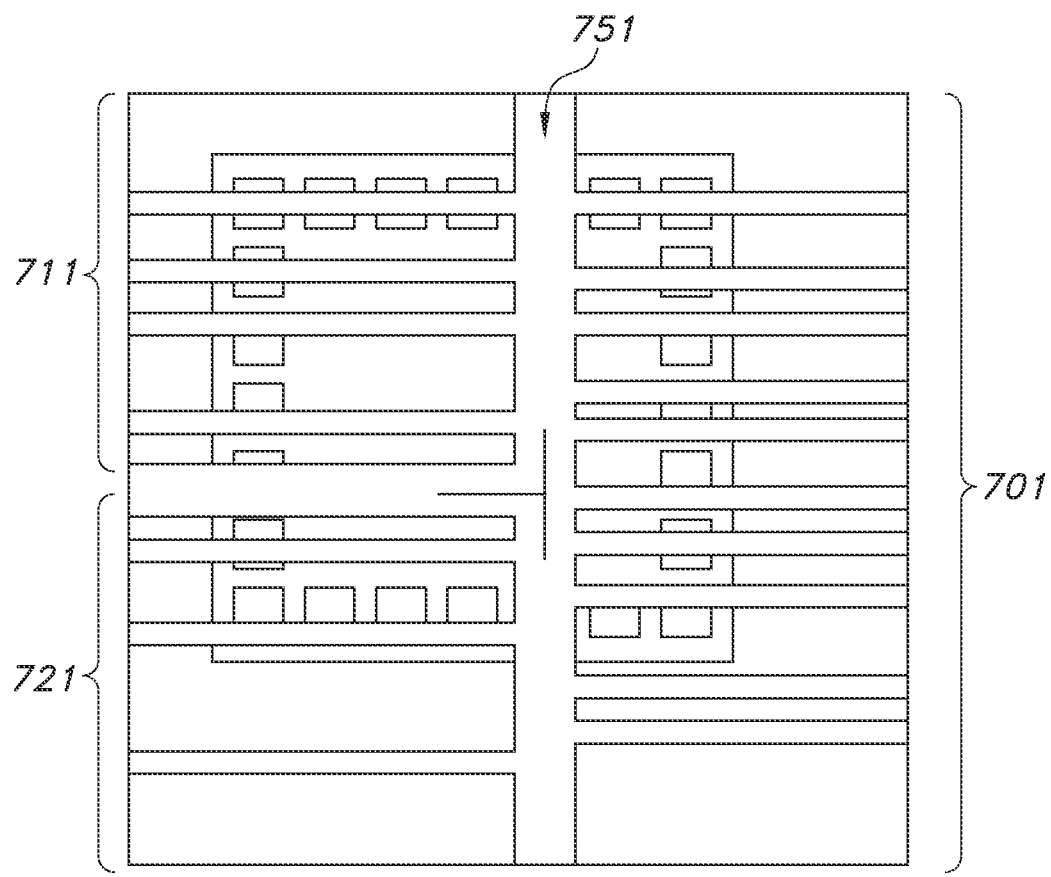
FIG. 7 shows a PUF object with a PIL that is the large box area with a barcode like pattern with an embedded fiducial T shape that bisects the PUF object into three regions.

FIG. 7 shows a PUF object with PIL that is the large box area with a barcode like pattern with an embedded fiducial T shape 751 that bisects the PUF object into three regions 701, 711, 721. The smaller bars act as a serialize index number. The T shape 751 with the wider conduction region acts as a location marker to orient the relative location of the reader sensor. In this case the conducting pads are only shown around the Hall Effect sensors that would be in the center area of the capacitive reading area.

It is also understood that if the capacitive sensing geometry is very thin then the conducting sensing pads could cover the entire area and cover the Hall effect sensors. The magnetic field would penetrate any non-ferrous material. It would be preferred that the capacitive sensing device would be less than 0.3 mm, to avoid substantially reducing the magnetic field that is read by the Hall effect sensors.

In another embodiment, the PIL is optically or acoustically detectable. The PIL may have predetermine information in any form that does not interfere with the magnetic fields of the PUF object. An example is ridges that are patterned into the plastic surface. This can be detected by a thin layer of organic thin-film transistor (OTFT) technology. An example of OTFT technology is marketed by FlexEnable®. Here, the 0.3 mm material can be sensed by an optical sensor that is described by FIG. 6 when used in conjunction with discrete or Hall effect prism design. The PIL may also be material printed (ink, toner, paint, etc.) onto the surface or within the PIL layer. The Flex Enable sensor is a magnetic transparent optical sensor. This will co-locate the ability to take an optical image of the surface of the PIL to decode the programmed information. OTFT material substrate material can exhibit piezoelectric affects that can be used as an acoustical detection method to find the ridges show in FIG. 8.

Figure 8:
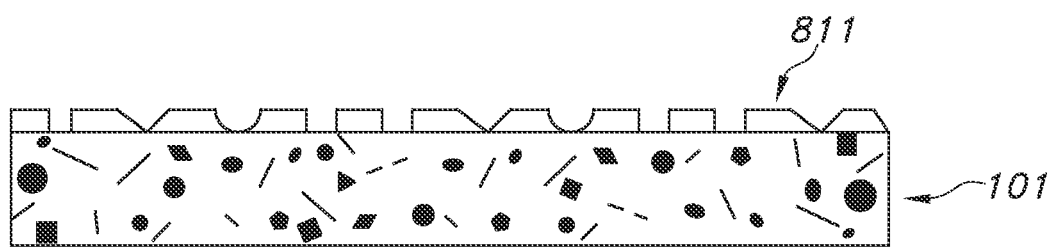
FIG. 8 shows a PIL cross section with surface shapes.

The ridges 811 may be etched, laser cut or thermally displaced for created by the inks, toners or paints. FIG. 8 shows a cross-section of a PIL with grooves, applied contouring or optical material. The PIL with the various materials is applied to the surface of the PUF matrix. The contours in FIG. 7 may also be embedded into the surface of the PUF matrix 101.

Another sensing combination is the addition of the "Dual-mode capacitive and ultrasonic fingerprint and touch sensor" system found in U.S. Pat. No. 10,127,425 with the Hall effect prism or discrete sensor design in FIGS. 5 and 6. These methods can be used in any combination with the magnetic field sensing. Additionally, the ultrasonic method can localize the surface of the PIL as well as the metallic flakes that are in the depth dimension. This 3D resolution could add an additional factor for validation.

It is also understood that the PIL may be oriented at any depth within the PUF object. The sensing method must only have the ability to distinguish between the random magnetic fields and the predetermined information.

Figure 9A:
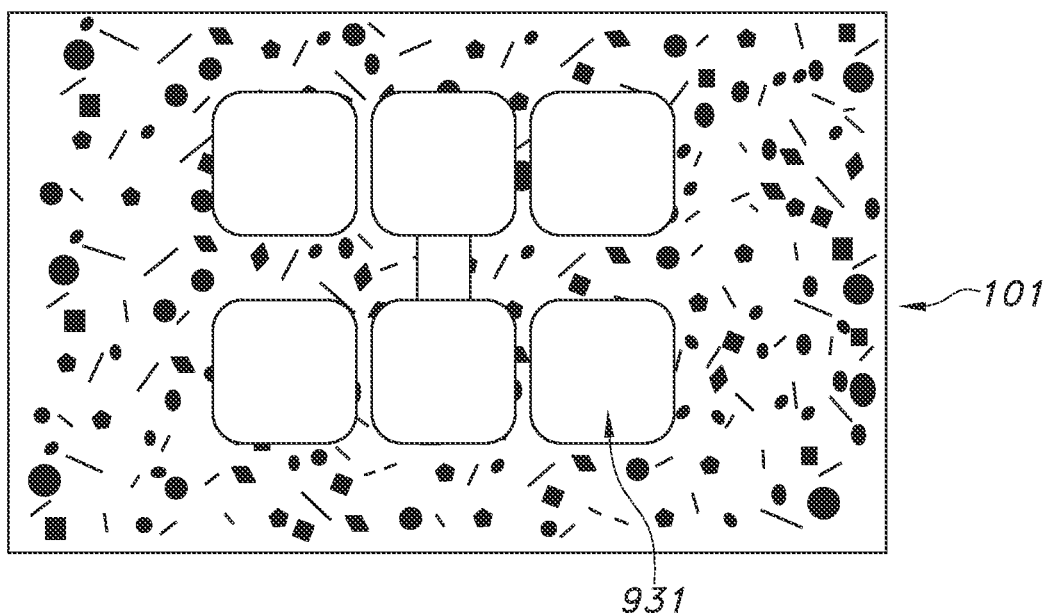
FIG. 9A shows a top view of a PIL with integrated circuit with interconnect pads.
Figure 9B:
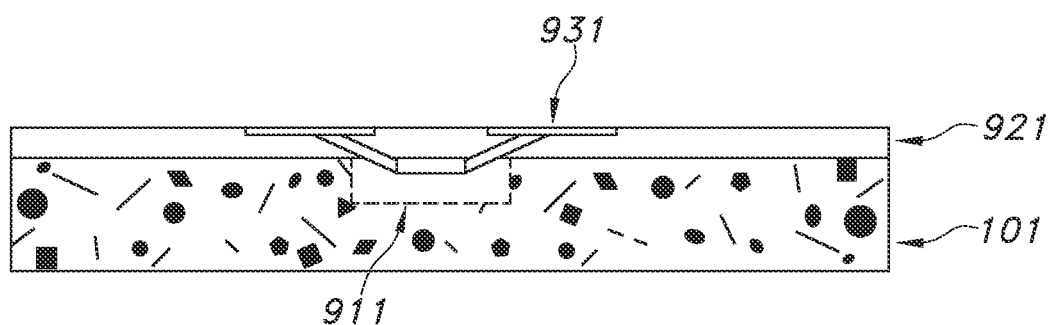
FIG. 9B shows a cross section of a PIL with integrated circuit with interconnect pads.

FIGS. 9A and 9B shows a PIL 921 with an integrated circuit embedded within the PIL or on top of the PUF matrix object. The recessed area 911 of the PUF object accommodates the additional thickness of the IC package. This recessed area may be a complete void below the IC and contacts. The conducting surface pads 931 are made of any non-ferrous conductor.

I claim:

1. A method of simultaneously reading a location of a known element and a random element such the locations of the known element and the location of the random element are paired, thus tying the locations together, comprising:
   providing a physical information layer ("PIL") with a conducting material;
   placing the PIL over a physical unclonable function element ("PUF"), where the PIL has a conducting material that is at least one order of magnitude larger than a pre-magnetized particle within the PUF, further wherein the PIL is constructed from a material that does not substantially alter a static magnetic field created by the pre-magnetized particles and a matrix dielectric material;
   using a sensor to simultaneously detect the conducting material of the PIL and the pre-magnetized particles in the PUF, wherein the sensor distinguishes between the conducting material and the pre-magnetized particles, further wherein the PIL uses the conducting material locations as a point of reference when paired with the pre-magnetized particles in the PUF that orient an enrollment of a magnetic profile of the PUF; and
   using the PIL to find a match in an enrolled database for the magnetic profile for verification against a unique random magnetic information.

2. The method of claim 1, wherein the PIL is capacitively detectable.

3. The method of claim 1, wherein the PIL is optically detectable.

4. The method of claim 1, wherein the PIL is acoustically detectable.

5. The method of claim 1, wherein the fiducials are box structures.

\* \* \* \* \*